United States Patent
Jones et al.

(10) Patent No.: US 6,895,122 B2
(45) Date of Patent: May 17, 2005

(54) METHOD AND SYSTEM FOR DETERMINING DCT BLOCK BOUNDARIES

(75) Inventors: Paul W. Jones, Churchville, NY (US); Majid Rabbani, Pittsford, NY (US); John E. Hoover, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 629 days.

(21) Appl. No.: 09/891,161

(22) Filed: Jun. 25, 2001

(65) Prior Publication Data

US 2003/0026478 A1 Feb. 6, 2003

(51) Int. Cl.$^7$ .............................. G06K 9/36; G06K 9/46
(52) U.S. Cl. ..................... 382/250; 382/166; 382/170; 382/233; 382/248; 375/240.2
(58) Field of Search ................................ 382/166, 168, 382/170, 232, 233, 248–251, 268, 275; 358/3.26, 426.04; 375/240.2, 240.24, 240.25, 240.29

(56) References Cited

U.S. PATENT DOCUMENTS

| | | | | |
|---|---|---|---|---|
| 5,629,780 A | * | 5/1997 | Watson | 382/250 |
| 6,101,278 A | * | 8/2000 | Chen et al. | 382/239 |
| 6,546,122 B1 | * | 4/2003 | Russo | 382/125 |

OTHER PUBLICATIONS

"Image Quality with Reiterative JPEG Compression" by Hiroshi Kinoshita and Tatsura Yamamuro. Journal of Imaging Science and Technology, vol. 39, No. 4, Jul./Aug. 1995, pp. 306–312.

(Continued)

*Primary Examiner*—Bhavesh M. Mehta
*Assistant Examiner*—Yubin Hung
(74) *Attorney, Agent, or Firm*—David M. Woods

(57) ABSTRACT

The horizontal and vertical offset for the M×N DCT block boundaries are determined for a decompressed image originally produced by a DCT-based compression system, regardless of the amount of compression and/or cropping that had been applied to the image. The method includes the steps of: a) computing one or more selected DCT coefficients from nonoverlapping, contiguous M×N blocks of the decompressed image, beginning at a selected offset; b) computing a coefficient histogram from a set of values for each selected DCT coefficient obtained from the blocks of the decompressed image; c) computing a dispersion metric from each coefficient histogram; d) repeating steps (a) through (c) for a plurality of offsets within an M×N block; e) comparing the dispersion metrics corresponding to the plurality of offsets to determine the minimum dispersion coefficient histogram; and f) selecting the offset that corresponds to the minimum dispersion coefficient histogram as the offset for the DCT block boundaries.

23 Claims, 8 Drawing Sheets

OTHER PUBLICATIONS

"Compression of 10-bit video using the tools of MPEG-2" by A. Tanju Erdem, M. Ibrahim Sezan. Signal Processing: Image Communication 7 (1995), p. 27-56.

"Requantization for Transcoding of MPEG-2 Intraframes" by Oliver Werner. IEEE Transactions on Image Processing, vol. 8, No. 2, Feb. 1999, pp. 179-191.

"Low-complexity rate-distortion optimal transcoding of MPEG I-frames" by R.L. Lagendijk, E.D. Frimout, J. Biemond. Signal Processing: Image communication 15 (2000), pp. 531-544.

"A study of multiple JPEG compression cycles in medical images" by Susan Young, Paul W. Jones, and David H. Foos. SPIE Medical Imaging 1998, vol. 3335, pp. 336-347.

"Blocking Artifacts Reduction in Image Compression with Block Boundary Discontinuity Criterion" by Byeungwoo Jeon and Jechang Jeong. IEEE Transactions on Circuits and Systems for Video Technology, vol. 8, No. 3, Jun. 1998, pp. 345-357.

"Reduction of blocking effect in DCT-coded images based on a visual perception criterion" by Francois-Xavier Coudoux, Marc Gazalet, Patrick Corlay. Signal processing: Image Communication 11 (1998), pp. 179-186.

"Frequency Domain Measurement of Blockiness in MPEG-2 Coded Video" by K.T. Tan and M. Ghanbari. IEEE Conf. on Image Processing, Vancouver, B.C. Sep. 2000.

* cited by examiner

METHOD AND SYSTEM FOR DETERMINING DCT BLOCK BOUNDARIES

FIELD OF THE INVENTION

The invention relates generally to the field of digital image processing, and in particular to a system for determining the DCT block boundaries in JPEG and MPEG-compressed images.

BACKGROUND OF THE INVENTION

The JPEG and MPEG international compression standards have been widely adopted for the efficient storage and transmission of still images and image sequences. A common aspect of these compression standards is that they use the discrete cosine transform (DCT) as a key component in the compression process. The DCT decomposes the original pixel values into a frequency domain representation (i.e., DCT coefficients), which can be quantized and efficiently encoded. Specifically, JPEG and MPEG apply the DCT to contiguous, nonoverlapping 8×8 blocks of pixels to produce 64 DCT coefficients for each block. Because the DCT coefficients are quantized, JPEG and MPEG are lossy compression methods, i.e., a compressed/decompressed image will not be identical to the original uncompressed image.

In some applications, it may be necessary to recompress an image or image sequence that has been previously compressed with JPEG or MPEG. Multiple compression cycles can introduce additional quality degradations, even if the same compression parameters are used for each cycle. The degradations that occur in multiple compression cycles have been described in the technical literature, including "Image quality with reiterative JPEG compression," J. Kinoshita and T. Yamamuro, J. Imaging Science and Technology, Vol. 39(4), pp. 306–312, 1995; and "Compression of 10-bit video using the tools of MPEG-2," A. T. Erdem and M. I. Sezan, Signal Processing: Image Communications, Vol. 7, pp. 27–56, 1995. In addition, other technical papers have described methods for minimizing quality loss when it is necessary to change the compression parameters between compression cycles (e.g., transcoding for a reduced bit rate). These papers include "Requantization for transcoding of MPEG-2 intraframes," O. Werner, IEEE Trans. Image Processing, Vol. 8(2), pp. 179–191, 1999; and "Low-complexity rate-distortion optimal transcoding of MPEG I-frames," R. L. Lagendijk, E. D. Frimout, and J. Biemond, Signal Processing: Image Communications, Vol. 15, pp. 531–544, 2000.

An implicit assumption in all of the previously referenced prior art is that the DCT blocks in each compression cycle are aligned with the DCT blocks in the previous cycle. However, block misalignment can occur when an image is cropped between compression cycles. It has been shown in "A study of multiple JPEG compression cycles in medical images," S. Young, P. W. Jones, and D. H. Foos, Proc. SPIE Medical Imaging, 3335, pp. 336–347, 1998, that a misalignment of the DCT blocks between compression cycles can lead to significant quality loss. The quality degradations introduced by multiple compression cycles will be minimized only when the DCT block boundaries are aligned in each cycle. This is true regardless of the specific compression parameters that are selected for each compression cycle.

Alignment of the DCT block boundaries is straightforward if the compressed file is available, since it can generally be assumed that the DCT blocks begin in the upper left corner of each image as per the methods defined in the JPEG and MPEG standards. However, in some cases, only a decompressed image is available, and this decompressed image may have been cropped at some point in its processing history. Cropping can destroy the conventional alignment of the DCT block boundaries because alignment will be maintained only if the cropping is done at integer multiples of 8 pixels in both the horizontal and vertical directions (because of the 8×8 DCT that is used in JPEG and MPEG). Thus, it is advantageous to have a method for determining the DCT block boundaries when only a decompressed image is available.

The determination of DCT block boundaries is also important in systems that attempt to improve the image quality of highly compressed JPEG images and MPEG image sequences. In such highly compressed images, severe quantization of the DCT coefficients leads to blocking artifacts as a result of the block-based nature of the 8×8 DCT. In order to reduce these blocking artifacts (a process known as "deblocking"), it is necessary to know the position of the DCT block boundaries. Again, if only a decompressed image is available, a method is required to determine these block boundaries.

Methods for reducing blocking artifacts in highly compressed images often include blockiness detection metrics that can be used to locate block boundaries. Papers from the technical literature that describe such techniques include "Blocking artifact reduction in image compression with block boundary discontinuity criterion," B. Jeon and J. Jeong, IEEE Trans. Circuits Systems Video Technology, Vol. 8(3), pp. 345–357, 1988; 'Reduction of blocking effect in DCT-coded images based on a visual perception criterion," F. -X. Coudoux, M. Gazalet, and P. Corlay, Signal Processing: Image Communications, Vol. 11, pp. 179–186, 1998; and "Frequency domain measurements of blockiness in MPEG-2 coded video," K. T. Tan and M. Ghanbari, IEEE Proc. Int. Conf. Image Processing, 2000. However, these methods are suitable only when distinct and severe blocking artifacts are present in the decompressed image. They will not work for determining the DCT block boundaries of cropped images at low to moderate compression levels, as described previously.

It is therefore advantageous to have a method for determining the DCT block boundaries of decompressed JPEG and MPEG images, regardless of the degree of compression that has been applied to the images.

SUMMARY OF THE INVENTION

The present invention is directed to overcoming one or more of the problems set forth above. Briefly summarized, according to one aspect of the present invention, the invention resides in a method (and system) for determining the horizontal and vertical offset for the M×N DCT block boundaries of a decompressed image produced by a DCT-based compression system. The method includes the steps of: a) computing one or more selected DCT coefficients from nonoverlapping, contiguous M×N blocks of the decompressed image, beginning at a selected offset; b) computing a coefficient histogram from a set of values for each selected DCT coefficient obtained from the blocks of the decompressed image; c) computing a dispersion metric from each coefficient histogram; d) repeating steps (a) through (c) for a plurality of offsets within an M×N block; e) comparing the dispersion metrics corresponding to the plurality of offsets to determine the minimum dispersion coefficient histogram; and f) selecting the offset that corresponds to the minimum dispersion coefficient histogram as the offset for the DCT block boundaries.

These and other aspects, objects, features and advantages of the present invention will be more clearly understood and appreciated from a review of the following detailed description of the preferred embodiments and appended claims, and by reference to the accompanying drawings.

ADVANTAGES

The present invention provides a method for reliably determining the DCT block boundaries of decompressed JPEG and MPEG images, regardless of the degree of compression that has been applied to the images. The method is also computationally efficient.

DETAILED DESCRIPTION OF THE INVENTION

Because image processing systems employing JPEG and MPEG compression are well known, the present description will be directed in particular to attributes forming part of, or cooperating more directly with, system and methodology in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

In describing a preferred embodiment of the present invention, the JPEG compression standard is used for the purposes of illustration. However, as is apparent to those skilled in the art, the same methods can be applied to MPEG-compressed image sequences because of the commonality of the 8×8 DCT. In addition, the same methods can be applied without limitation to other compression systems that use a DCT, including those that use a DCT of arbitrary size M×N, where M is typically equal to N.

Figure 1:
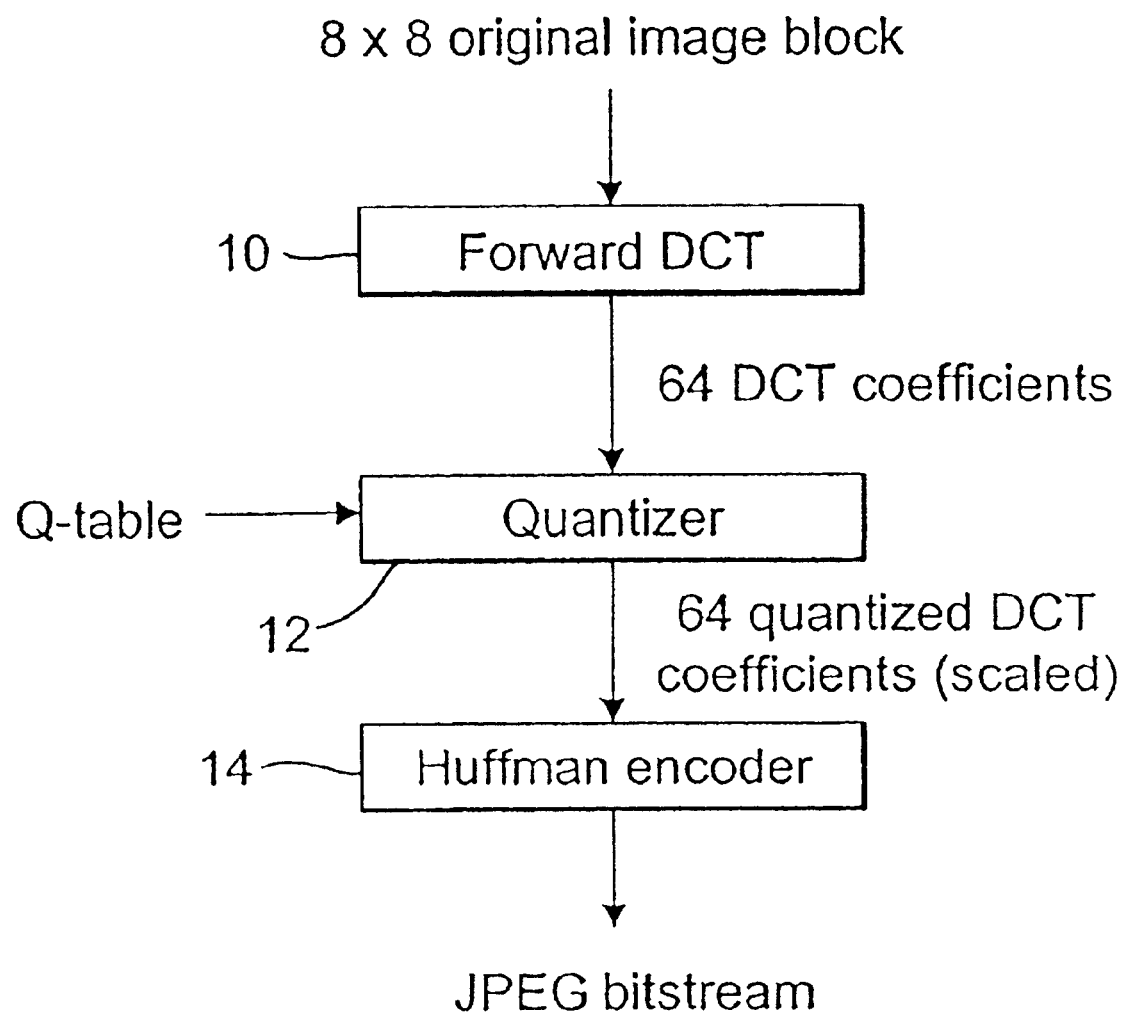
FIG. 1 illustrates a prior art JPEG compression system.

Before describing the present invention, it is instructive to review the basic components of a JPEG compression and decompression system. As illustrated in FIG. 1, an original image is compressed by forming 8×8 nonoverlapping, contiguous blocks of pixel values, and each 8×8 block is transformed to the spatial frequency domain using the forward DCT 10. The output of the DCT is 64 DCT coefficients for each original 8×8 image block. The lowest frequency DCT coefficient is termed the DC coefficient, and it is proportional to the mean value of a block. The remaining coefficients are termed AC coefficients, and they represent fluctuations around the mean value. For most images, a significant portion of the image energy is packed into the lower frequency coefficients, which generally results in larger values for these coefficients.

The DCT coefficients are then processed by a quantizer 12, which limits the number of possible values for each coefficient. The amount of quantization is specified by a quantization table (q-table), which provides the degree of quantization for each of the 64 DCT coefficients from an 8×8 block. Larger q-table values indicate more quantization and hence more errors for the corresponding DCT coefficients. It is common to select the q-table values using properties of the human visual system, which result in greater quantization for the DCT coefficients corresponding to higher spatial frequencies. For completeness, it is noted that the quantized coefficients that are produced in the JPEG system are scaled versions of the actual quantized values. This is done for convenience in the subsequent encoding process, and the particular scaling is largely irrelevant in the context of the present invention.

Figure 2:
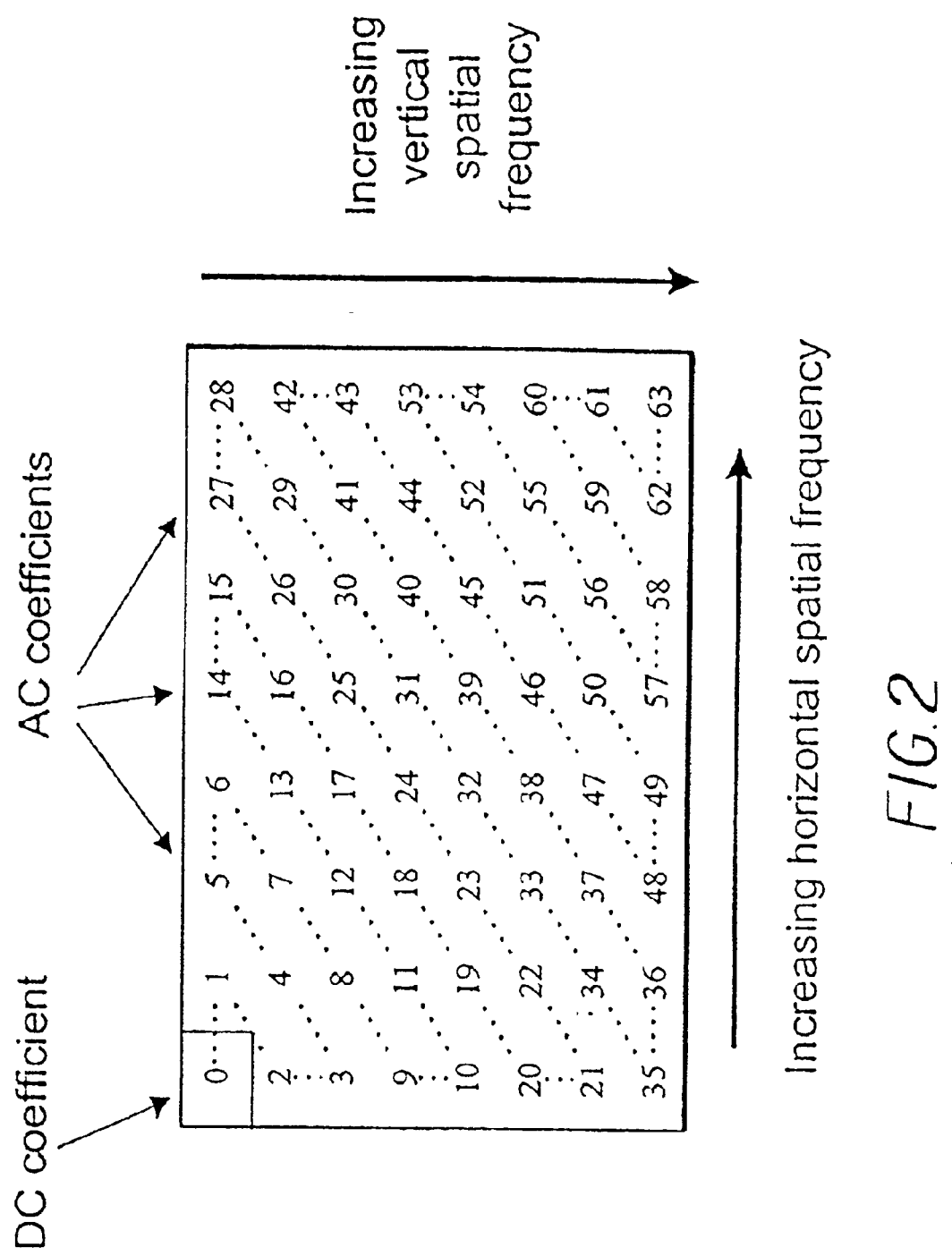
FIG. 2 illustrates a prior art arrangement of DC and AC coefficients produced by a JPEG compression system.

The final step in JPEG compression is the conversion of the quantized DCT coefficients to the binary codewords that form the JPEG bitstream. This is done using a Huffman encoder 14 in the JPEG baseline system. A full discussion of the JPEG encoding process is not needed to describe the present invention, but it is useful to note that the coefficients for a given block are ordered using a zigzag scan prior to encoding. This ordering is illustrated in FIG. 2, where the DC coefficient is labeled 0, and the AC coefficients are labeled 1 to 63 where the ordering goes from lower frequencies to higher frequencies. We will use this naming convention in subsequent discussions of the DCT coefficients.

Figure 3:
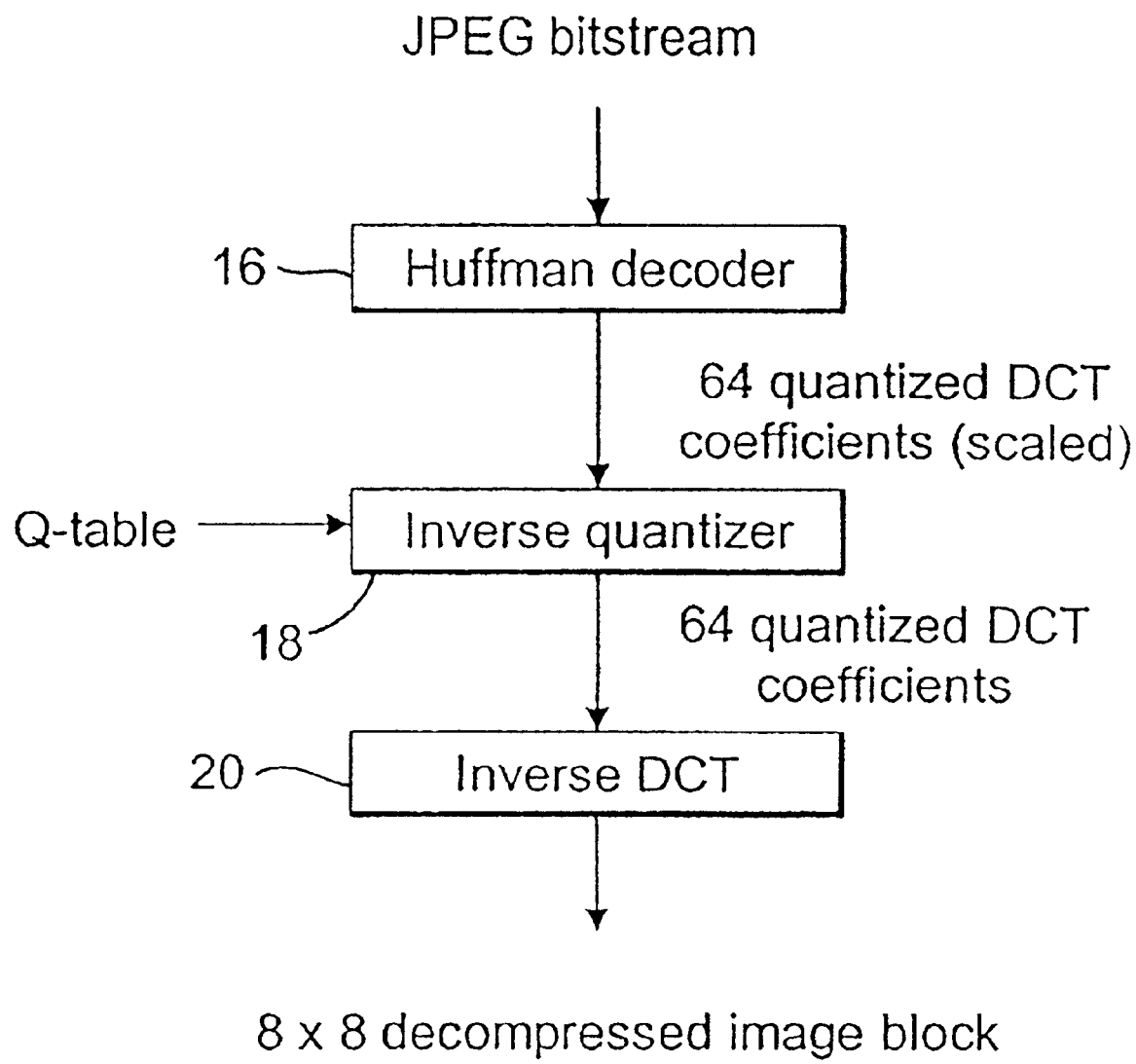
FIG. 3 illustrates a prior art JPEG decompression system.

As illustrated in FIG. 3, the JPEG decompression system accepts a JPEG bit stream and applies a Huffman decoder 16 to recover the 64 scaled, quantized DCT coefficients for each 8×8 block from the binary codewords. These scaled, quantized coefficients are processed by an inverse quantizer 18, which undoes the scaling that was performed by the compression system. The inverse quantization process requires the q-table that was used by the quantization process during encoding. The resulting 64 quantized DCT coefficients for each block are then transformed into the spatial domain using the inverse DCT 20. The output is an 8×8 decompressed image block for each set of 64 quantized DCT coefficients. Finally, the decompressed image blocks are concatenated to form the decompressed image.

In the present invention, a fundamental statistic is the DCT coefficient histogram that is formed by analyzing the coefficients that correspond to a given spatial frequency (e.g., the DC coefficients, the AC 3 coefficients as shown in FIG. 2, etc.). The coefficient histogram for a given spatial frequency is computed by counting the number of times that each coefficient value occurs across all of the 8×8 blocks in an image. The number of occurrences (i.e., the histogram count) for each coefficient value is then indexed by the coefficient value to form a two-dimensional table that can be plotted for easy visualization. The shape of the coefficient histogram will depend upon which spatial frequency is selected and whether quantization has been performed on the coefficients. We first consider some example histograms for unquantized DCT coefficients, which would be produced by decomposing an original image using the forward DCT. These are followed by examples for quantized DCT coefficients, which would be produced by decomposing an image that has previously been compressed and decompressed.

Figure 4:
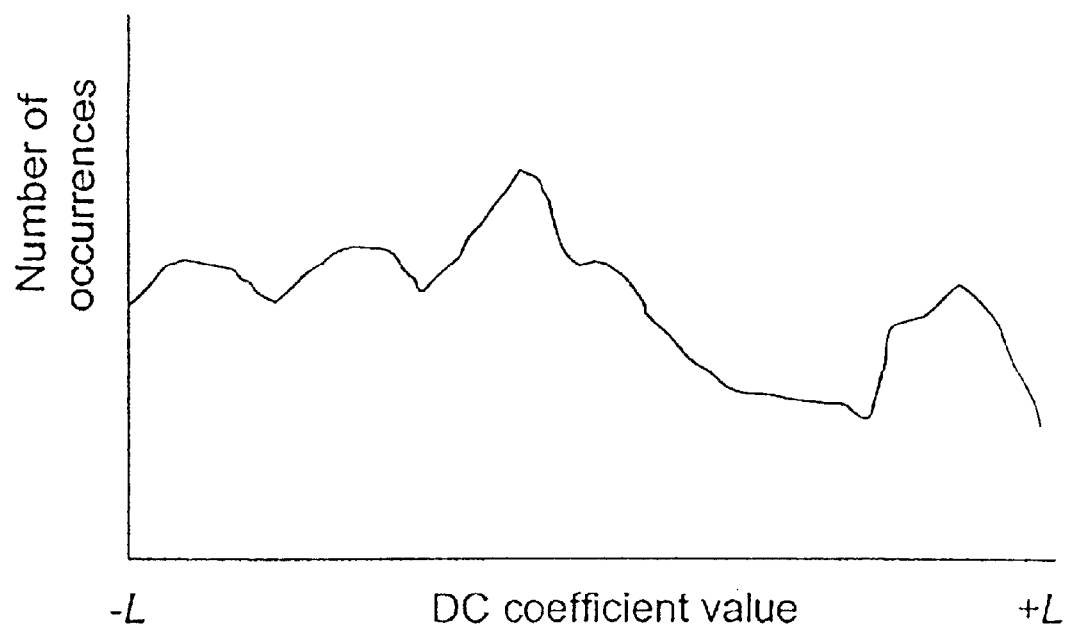
FIG. 4 is an example coefficient histogram for unquantized DC coefficients.
Figure 5:
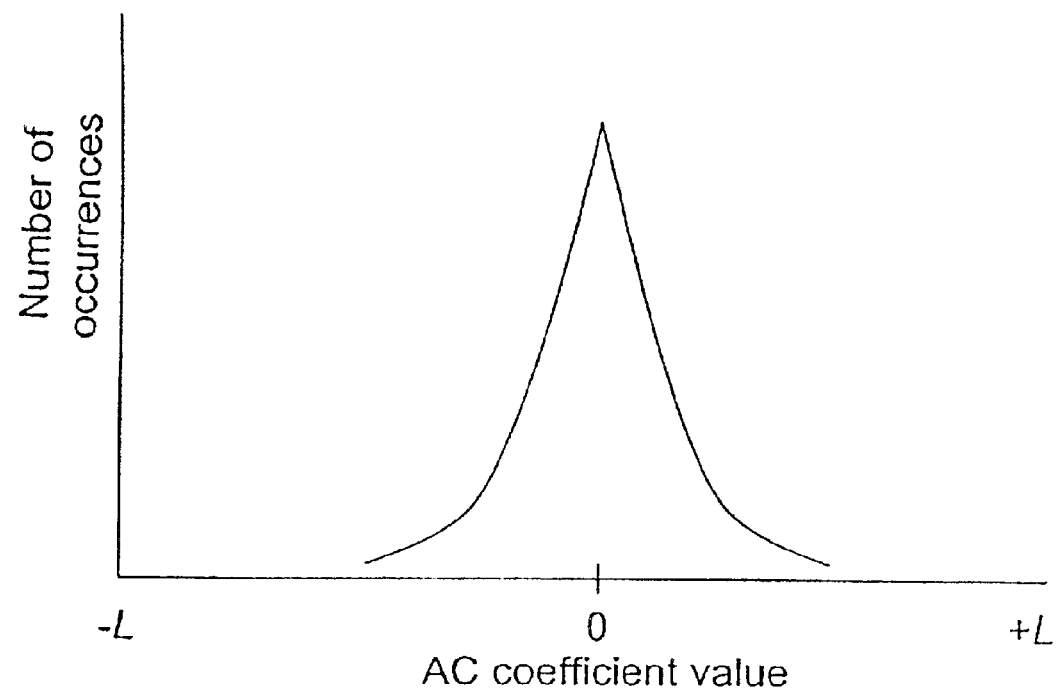
FIG. 5 is an example coefficient histogram for unquantized AC coefficients.

FIG. 4 is an example of a histogram of unquantized DC coefficients. The DC coefficient histogram will vary substantially from image to image, but it is typically well populated across the range of possible coefficient values (−L, +L) as illustrated in FIG. 4. We note that the range of DC coefficient values includes negative numbers because a value of 128 has been subtracted from each pixel prior to computing the coefficient as per the JPEG specifications. FIG. 5 shows an example of a histogram of unquantized AC coefficients (AC coefficient 10 in FIG. 2). The histograms for the AC coefficients will also vary, both from coefficient to coefficient and from image to image. However, the basic form is often similar to FIG. 5 in that the AC coefficient values are typically centered around zero and large coefficient values are unlikely.

Figure 6:
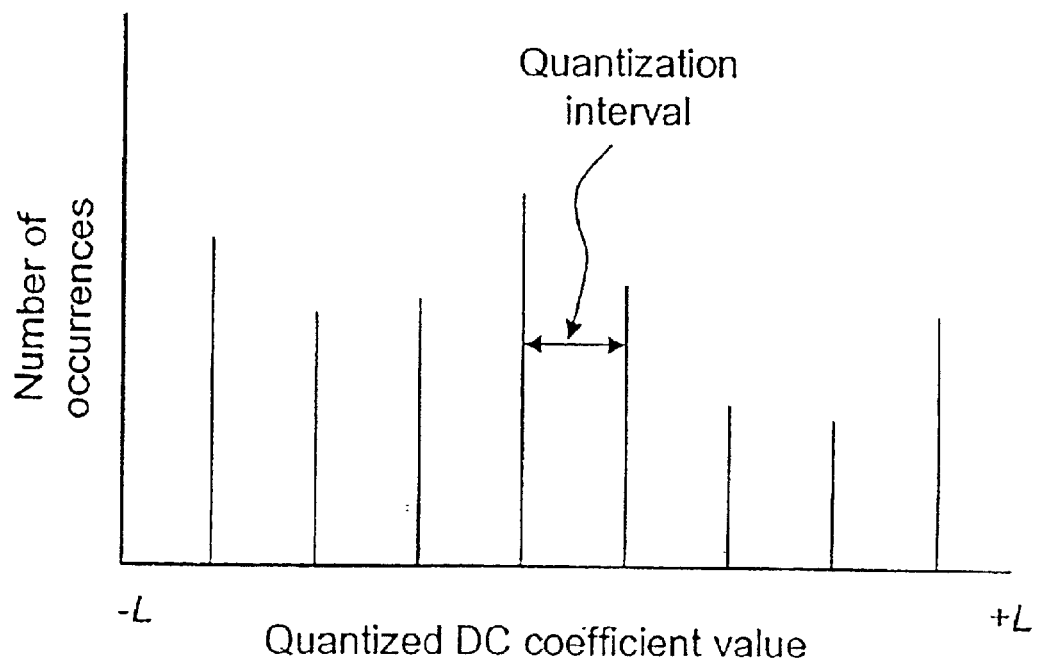
FIG. 6 is an example coefficient histogram for quantized DC coefficients.

The effect of quantization on the coefficient histograms is illustrated in FIG. 6 for the DC coefficients. Quantization is a many-to-one mapping, resulting in all coefficients within a given interval being represented by a single value. This shows up in the coefficient histogram as distinct spikes at the possible quantized values. The spacing between the possible quantized values is known as the quantization interval. In the case of JPEG, the quantization interval for a given DCT coefficient is equivalent to the corresponding q-table value. Thus, the spacing between quantized values will generally be smaller for the low spatial frequency coefficients, which have smaller q-table values, as compared to the higher spatial frequency components.

Figure 7:
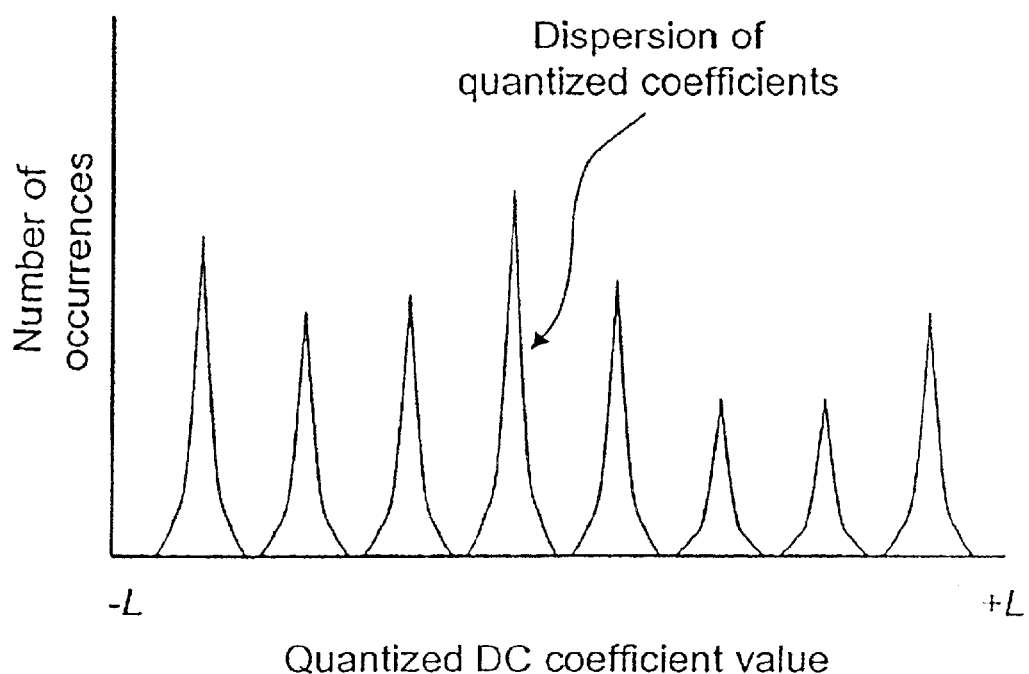
FIG. 7 is an example coefficient histogram for quantized DC coefficients illustrating dispersion of the quantized coefficients.

Now, if an image has been JPEG compressed and decompressed, the decompressed image will be reconstructed using only those components that correspond to the quantized DCT coefficients. However, if an image has been compressed and decompressed, and the image is subsequently decomposed using the forward DCT, the resulting coefficient histograms will no longer contain only the distinct spikes that are shown in FIG. 6. Instead, each spike will be dispersed across a number of coefficient values as shown in FIG. 7.

This dispersion of the spikes in the coefficient histograms is the result of limited arithmetic precision. Specifically, a decompressed image must be represented using finite precision, although the inverse DCT actually produces floating point values. In the case of the JPEG baseline system, the decompressed image is produced by rounding reconstructed pixel values to integers between 0 and 255. If the decompressed image is subsequently decomposed by applying the forward DCT, the resulting DCT coefficients will no longer be restricted to the quantized coefficient values. In addition, color images are typically transformed from an RGB colorspace to a luma/chrominance color space (such as YCbCr) prior to compression and subsequently transformed back to RGB upon decompression. These color transformations also require finite precision representations for the data, which introduces additional dispersion in the DCT coefficients.

Figure 8:
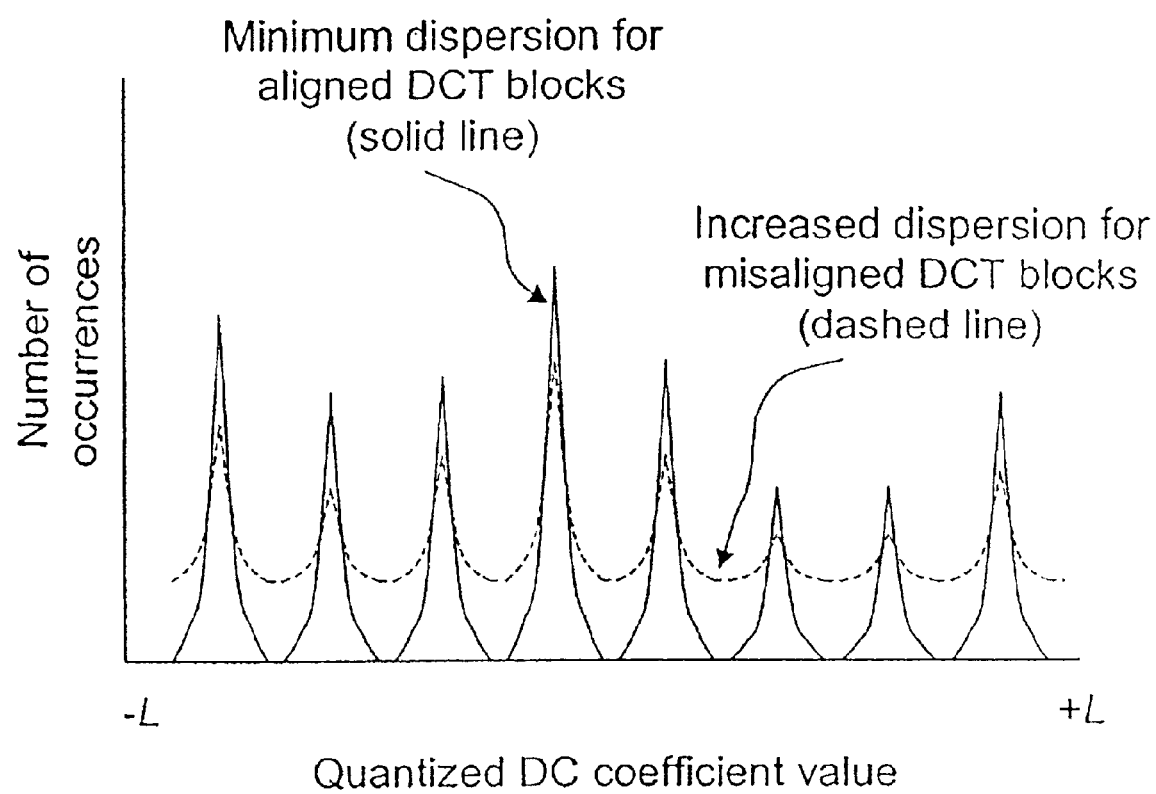
FIG. 8 is an example coefficient histogram for quantized DC coefficients illustrating increased dispersion for misaligned DCT blocks.

The present invention is based on the observation that the dispersion of the quantized DCT coefficients is minimized when the DCT blocks of the decomposition process are aligned with those of the initial compression process. This observation can be explained by considering an example where the DC coefficient is computed for an 8×8 block that spans two previously encoded 8×8 blocks. Besides the dispersion that is introduced by the finite precision representations as described previously, there is now an additional dispersion in the coefficient values caused by averaging across two previously quantized blocks. An example of this additional dispersion for a DC coefficient histogram is shown in FIG. 8. The extra dispersion that is introduced by the misalignment of blocks is dependent upon the image, the degree of quantization in the previous compression cycle, and the choice of DCT coefficient. However, it is generally not dependent on the amount of misalignment. "A miss is as good as a mile" in this case.

Figure 9:
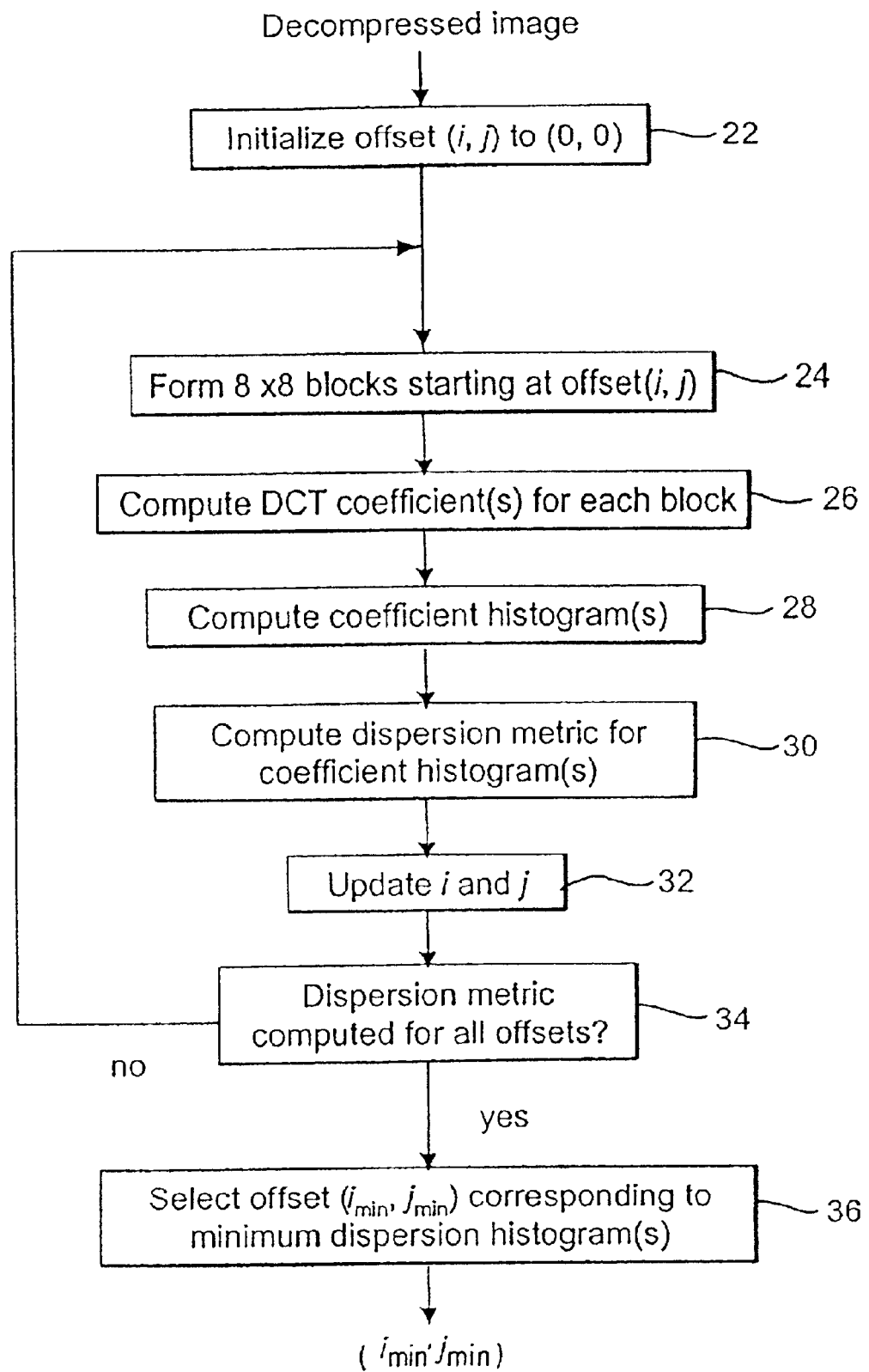
FIG. 9 is a block diagram of the present invention method for determining the horizontal and vertical offset that corresponds to the DCT block boundaries.

A block diagram of the present invention is illustrated in FIG. 9. The basic approach is to compute the histogram for one or more DCT coefficients at all possible offsets of the DCT block boundaries, and then find the offset that produces the minimum dispersion histogram(s). Because JPEG uses 8×8 blocks, it is only necessary to search over offsets of 0 to 7 pixels in both the horizontal and vertical directions, for a total of 64 possible offsets. Referring to FIG. 9, the horizontal and vertical offset, denoted as (i, j), is initialized to (0, 0) using an offset initialization unit 22. Nonoverlapping, contiguous blocks are then formed from the decompressed image using a block formation unit 24, starting at the initial offset of (0, 0). For previously compressed JPEG and MPEG images, the block size is 8×8, but more generally, the block size is M×N, corresponding to the size of the DCT that was used for compression.

For each block, one or more DCT coefficients are computed using a coefficient computation unit 26. The coefficient computation unit 26 could perform a complete DCT (i.e., all 64 coefficients for an 8×8 DCT) as in the DCT 10 of FIG. 1, but it is generally necessary to only compute one, or perhaps a few, coefficients for each block. This is much more efficient than computing the complete set of DCT coefficients. The selection of appropriate DCT coefficients will be discussed shortly.

For each selected coefficient, the values from all blocks in the image are combined to form a DCT coefficient histogram using a coefficient histogram unit 28. For each coefficient histogram, a dispersion metric is computed and stored using a dispersion metric computation unit 30. The specific form of the dispersion metric will be discussed shortly. The horizontal and vertical offsets are then updated to a new offset (i, j) by an offset update unit 32, and the process of forming the 8×8 blocks, computing the DCT coefficient(s), computing the coefficient histogram, and computing the dispersion metric is repeated. This process is repeated for all possible offsets, and the process is terminated when an offset testing unit 34 determines that all possible offsets have been evaluated. For the 8×8 DCT used in JPEG and MPEG, there are 64 possible offsets as discussed previously. More generally, there are M×N possible offsets for an M×N DCT.

After the dispersion metric has been computed for all possible offsets, the dispersion metrics are compared using a dispersion metric comparison unit 36 to determine the offset that produces the minimum dispersion coefficient histogram. The horizontal and vertical offset ($i_{min}$, $j_{min}$) that corresponds to the minimum dispersion histogram is selected as being the offset that corresponds to the DCT block boundaries. If dispersion metrics have been computed for more than one DCT coefficient (e.g., the DC coefficient and an AC coefficient), an offset can be determined for each coefficient and the results can be combined, if desired, to determine the offset of the DCT block boundaries. However, we have found that a single coefficient is generally sufficient in practice.

As noted, most JPEG compression is performed in luma/chrominance (e.g., YCbCr) colorspace, with explicit 2× spatial subsampling (horizontally and vertically) of the chrominance channel prior to compression. Most of the image energy is contained in the luma channel, so the DCT coefficients for the chrominance channels typically are very low amplitude. Because of the subsampling and the low amplitude coefficients, detection of the DCT block boundaries in the chrominance channels is more difficult. For this reason, we restrict all processing to the luma channel only. Once the DCT block boundaries are known for the luma channel, it is simple to derive the block boundaries for the chrominance channels.

Now, there are several issues in the block boundary detection process that was just described. The first is the selection of DCT coefficients to be used for computing the coefficient histograms and subsequent dispersion metrics. The second is the precision that is required for the coefficient histograms (i.e., the number of histogram bins). The third is the specific form of the dispersion metric. We now address each of these issues.

The selection of the DCT coefficients is a balance between computational efficiency and robustness of the alignment process. It is possible to compute all 64 DCT coefficients, but this is very computationally intensive since it must be done for all possible offsets. This is equivalent to performing 64 DCTs for each image. Instead, good performance can be achieved by considering only a single coefficient or at most a small number of DCT coefficients. It is advantageous to select coefficients that are in a frequency region where images have significant energy, so that the histograms will be populated over a range of values. This implies that the lower frequency coefficients should be used because the higher frequency coefficients typically have small values and undergo significant quantization, which results in many high frequency coefficients being quantized to zero.

There is also an interaction with the q-table values that were used in the previous compression cycle. For low q-tables values, there is a narrow spacing between the peaks in the histogram (i.e., the quantization interval is small), and it may be more difficult to detect the increased dispersion in the coefficient histogram. For most JPEG-compressed images, the low q-table values occur at low spatial frequencies, which is where most of the image energy is located. Therefore, there may be a trade-off between image energy and q-table value when selecting a coefficient for the histogram computation.

Finally, certain coefficients can be computed very efficiently because of the specific pixel weights that are used. For example, the DC coefficient is merely the unity sum of all pixels in a block, and AC coefficients 10 and 14 are the unity sums and differences of the rows and columns, respectively. Other coefficients require floating point weights that are computationally less efficient. In practice, we have found that the DC coefficient provides robust alignment performance, while also being very simple to compute, even when the corresponding q-table value is very small.

Another important decision in the block boundary detection process is the selection of the number of bins to be used for the coefficient histograms. In a JPEG-compressed image, the quantized coefficients are inherently restricted to integer values between approximately −1024 and +1024. This range of values is determined by the definition of the DCT in the JPEG standard. However, when a compressed/decompressed JPEG image is decomposed using the DCT, the resulting DCT coefficients will not strictly be integers because of the precision issues that were described previously. If a coefficient histogram only contains bins representing the same range of integer values from −1024 to +1024 (or 2048 bins), it is difficult to detect the increased dispersion of the coefficients because of misaligned DCT blocks. Therefore, it is advantageous to use an increased precision for the coefficient histograms. This can be done by scaling the DCT coefficients and rounding to the nearest integer prior to computing the histogram. It is convenient to scale by powers of two, so the resulting histograms may contain, for example, 4096 or 8192 bins. In practice, we have found that these modest increases in precision are sufficient to provide robust alignment performance with the present invention.

The final consideration is the dispersion metric to be applied to the histogram. The basic approach is to note that the histogram values will be clustered around the original quantized coefficient values. When the DCT blocks are properly aligned, the spread of these clusters should be minimized and the peaks of these clusters should be highest. This suggests numerous possibilities for the dispersion metric, including:

zeroth-order entropy of the coefficient histogram,
variance of the coefficient histogram counts,
ratio or difference of max and min coefficient histogram counts,
number of coefficient histogram bins with non-zero counts.

To understand the rationale for these metrics, we will consider a histogram denoted as H(n), where H(n) is the histogram count for a scaled coefficient value n, and the coefficient indices range from −L to +L (e.g., −2048 to +2048 for a scaling factor of two with the JPEG system). Entropy is defined as:

$$\text{Entropy} = -\sum_{-L}^{+L} p(n) \log_2 p(n),$$

where p(n) is the probability of a particular histogram value and is given by:

$$p(n) = \frac{H(n)}{B},$$

and B is the total number of histogram counts, which is equal to the total number of blocks over which the DCT coefficients have been computed. Entropy is maximized when a distribution is uniform, which implies that the minimum entropy histogram represents the tightest clustering and hence the correct DCT block alignment. Both the variance of the histogram counts and the ratios or differences of the maximum and minimum histogram counts are attempting to quantify the degree of peakedness of the counts, which should be maximized when the DCT blocks are aligned. The variance of the histogram counts is defined as:

$$\text{Variance} = \frac{1}{B}\sum_{-L}^{+L}[H(n)]^2 - \left(\frac{1}{B}\sum_{-L}^{-L}H(n)\right)^2,$$

and we note that the variance of the histogram counts is different from the variance of the histogram values, which we found was not a robust dispersion metric. Finally, for images that have been heavily compressed, there will be many bins that are zero because of the large quantization intervals of the coefficients. We would expect that the number of zero histogram bins (i.e., the bins where H(n)=0) would be maximized when the blocks are aligned. We note that all of these metrics are very simple to compute.

In a preferred embodiment of the present invention, the dispersion metric is the ratio of the sums of histogram counts at periodic intervals. Specifically, if the coefficient histogram has been computed for scaled DCT coefficients (with increased precision as described previously), the periodic intervals correspond to the scaling factor. For example, if the coefficients have been scaled by a factor of two prior to computing the histogram, two sums would be computed: the sum of the odd-indexed bins and the sum of the even-indexed bins. If the coefficients have been scaled by a factor of four, then four sums would be computed with a periodic interval of four histogram counts. In general, for a scaling factor of k, there are k sums that are formed (denoted as $S_i$, i=0, 1, . . . , k−1):

$$S_i = \sum_{-L}^{+L} H(n)$$

for all values of n that satisfy n (modulo k)=i, where again H(n) is the histogram count for a scaled coefficient value n, and the coefficient indices range from −L to +L. After the histograms sums have been computed, the dispersion metric is computed as the ratio of the maximum sum to the minimum sum, where the maximum and minimum sums are selected from the set of k sums. The offset (i, j) that corresponds to the maximum ratio of the sums is selected as the block boundary location.

To see why this sum ratio metric provides a good measure of the dispersion of the histogram, consider the case where the DCT coefficients are scaled by a factor of two prior to computing the histogram. Recall that the quantized coefficients in the original JPEG-compressed image are inherently restricted to integer values between approximately −1024 and +1024. If the quantized coefficients are scaled by a power of two, the resulting histogram should only contain even values. When the DCT coefficients are dispersed because of finite precision and block misalignment, the coefficient histogram will contain odd values in addition to even values. However, the dispersion of the even-valued coefficients into the odd-valued bins will be minimized when the DCT blocks are aligned. Correspondingly, the sum of the odd-indexed bins will be minimized and the sum of the even-indexed bins will be maximized. Thus, the ratio of the even-indexed sum to the odd-indexed sum should be maximized when the DCT blocks are aligned.

The average performance of various dispersion metrics is shown in Table 1 for a test set of 11 images at various JPEG compression ratios. (The all 1's q-table does not correspond to a specific compression ratio, but it represents the minimum possible compression for a JPEG system.) The results are reported as the probability of the correct offset being chosen. For these results, the number of histogram bins was set to 4096, and the histograms for the DC coefficient and AC coefficients 10 and 14 were computed. It can be seen that the ratio of the maximum/minimum histogram sums is an excellent indicator of the correct DCT block alignment across a broad range of compression ratios. The entropy and the variance of the histogram bin counts of the DC coefficient are also good indicators at moderate to high compression ratios. The improved performance of the dispersion metrics at higher compression ratios can be explained by noting that the spacing of the histogram clusters is larger, which provides a greater distinction between the histogram peaks and valleys. The robust performance at higher compression ratios is an important characteristic, since DCT block misalignment will have the most severe effect for heavily compressed images. For images that are compressed to low compression ratios, DCT block misalignment for subsequent compression cycles will have a lesser effect on image quality.

Figure 10:
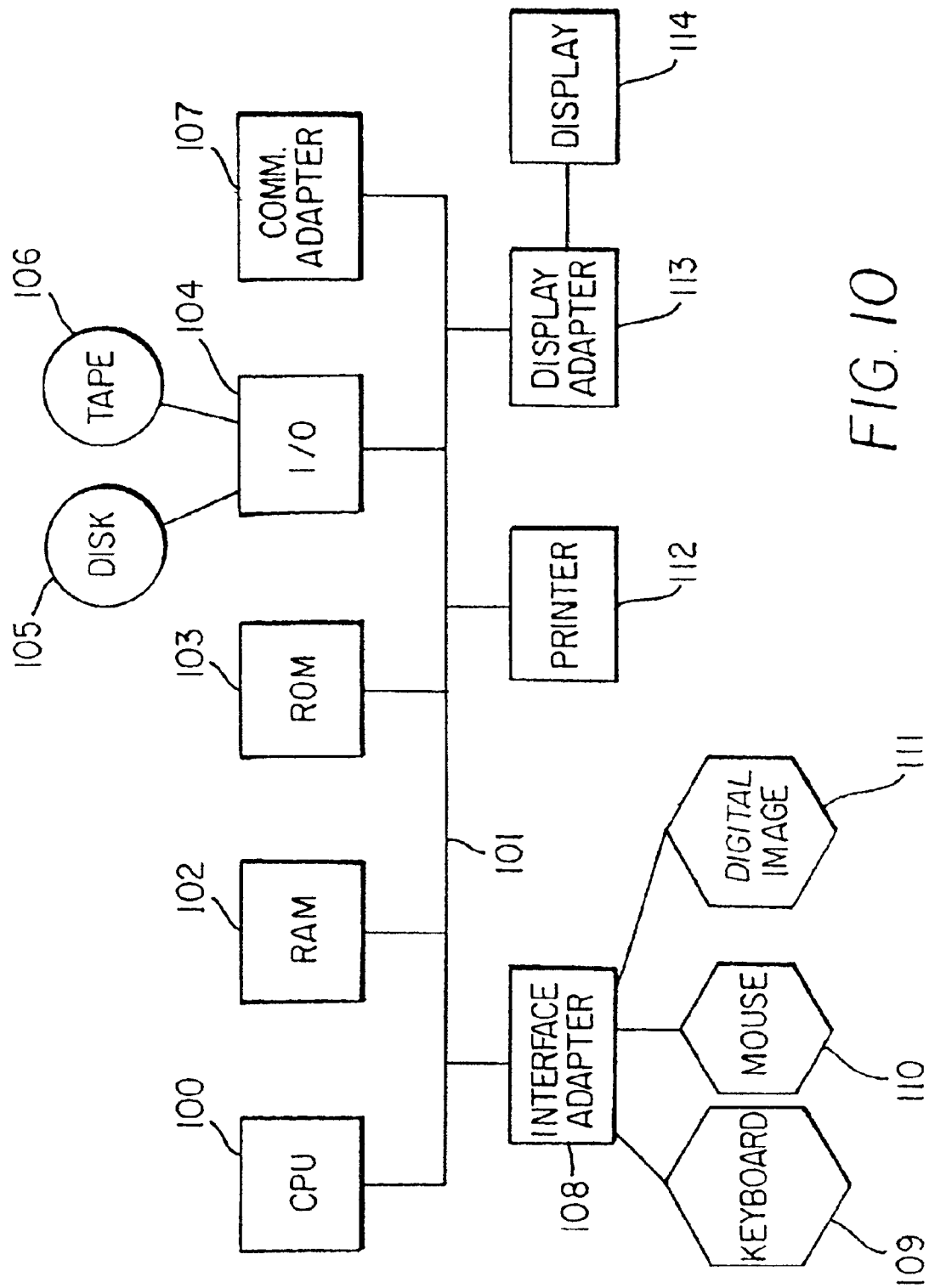
FIG. 10 is a system level diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 10, a typical hardware configuration of an information handling/computer system in accordance with the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting an information handling system to a data processing network), a user interface adapter 108 (for connecting peripherals 109, 110, 111 such as a keyboard, mouse, digital image input unit (e.g., a scanner), microphone, speaker and/or other user interface device to the bus 101), a printer 112 and a display adapter 113 (for connecting the bus 101 to a display device 114). The invention could be implemented using the structure shown in FIG. 10 by including the inventive method within a computer program stored on the storage device 105. Such a computer program would act on compressed images supplied through the interface adapter 108 or through the network connection 107 and decompressed by the CPU 100. The system would then automatically determine the DCT block boundaries of decompressed JPEG and MPEG images, regardless of the degree of compression that has been applied to the images at an earlier stage.

The invention has been described in detail with particular reference to certain preferred embodiments thereof, but it will be understood that variations and modifications can be effected within the spirit and scope of the invention.

TABLE 1

Probability of correct offset for different dispersion metrics with 11 test images.

| | | Dispersion metric | | | |
|---|---|---|---|---|---|
| DCT coeff. | Compression ratio | Entropy | Count variance | Number of zero bins | Max-to-min sum ratio |
| DC | All 1's q-table | 0.91 | 1.00 | 0.36 | 1.00 |
| | 5:1 | 1.00 | 1.00 | 0.27 | 1.00 |
| | 10:1 | 1.00 | 1.00 | 0.82 | 1.00 |
| | 20:1 | 1.00 | 1.00 | 1.00 | 1.00 |
| | 40:1 | 1.00 | 1.00 | 1.00 | 1.00 |

TABLE 1-continued

Probability of correct offset for different dispersion metrics with 11 test images.

| DCT coeff. | Compression ratio | Dispersion metric | | | |
|---|---|---|---|---|---|
| | | Entropy | Count variance | Number of zero bins | Max-to-min sum ratio |
| AC 10 | All 1's q-table | 0.55 | 0.55 | 0.00 | 1.00 |
| | 5:1 | 0.27 | 0.46 | 0.36 | 1.00 |
| | 10:1 | 1.00 | 1.00 | 0.82 | 1.00 |
| | 20:1 | 1.00 | 1.00 | 1.00 | 1.00 |
| | 40:1 | 1.00 | 1.00 | 1.00 | 1.00 |
| AC 14 | All 1's q-table | 0.55 | 0.55 | 0.00 | 1.00 |
| | 5:1 | 0.55 | 0.64 | 0.18 | 1.00 |
| | 10:1 | 1.00 | 1.00 | 1.00 | 1.00 |
| | 20:1 | 1.00 | 1.00 | 1.00 | 1.00 |
| | 40:1 | 1.00 | 1.00 | 1.00 | 1.00 |

PARTS LIST

| | |
|---|---|
| 10 | forward DCT |
| 12 | quantizer |
| 14 | Huffman encoder |
| 16 | Huffman decoder |
| 18 | inverse quantizer |
| 20 | inverse DCT |
| 22 | offset initialization unit |
| 24 | block formation unit |
| 26 | coefficient computation unit |
| 28 | coefficient histogram unit |
| 30 | dispersion metric computation unit |
| 32 | offset update unit |
| 34 | offset testing unit |
| 36 | dispersion metric comparison unit |
| 100 | CPU |
| 101 | bus |
| 102 | RAM |
| 103 | ROM |
| 104 | I/O adapter |
| 105 | disk unit |
| 106 | tape drive |
| 107 | communication adapter |
| 108 | interface adapter |
| 109 | keyboard |
| 110 | mouse |
| 111 | digital image input unit |
| 112 | printer |
| 113 | display adapter |
| 114 | display device |

What is claimed is:

1. A method for determining the horizontal and vertical offset for the M×N DCT block boundaries of a decompressed image produced by a DCT-based compression system, comprising the steps of:
   a) computing one or more selected DCT coefficients from nonoverlapping, contiguous M×N blocks of the decompressed image, beginning at a selected offset;
   b) determining a coefficient dispersion for each selected DCT coefficient from a set of values for the respective DCT coefficient obtained from the blocks of the decompressed image;
   c) repeating steps (a) and (b) for a plurality of offsets within an M×N block; and
   d) identifying the offset that minimizes the coefficient dispersion, thereby determining the block boundaries of the decompressed image.

2. The method according to claim 1 wherein step b) further comprises:
   b1) computing a coefficient histogram from the set of values for each selected DCT coefficient obtained from the blocks of the decompressed image; and
   b2) computing a dispersion metric from each coefficient histogram.

3. The method according to claim 2 wherein step d) further comprises:
   d1) comparing the dispersion metrics corresponding to the plurality of offsets to determine the minimum dispersion coefficient histogram; and
   d2) selecting the offset that corresponds to the minimum dispersion coefficient histogram as the offset for the DCT block boundaries.

4. The method according to claim 1, wherein M=8 and N=8.

5. The method according to claim 1, wherein the decompressed image is a JPEG-decompressed image.

6. The method according to claim 1, wherein the decompressed image is an MPEG-decompressed image.

7. A method for determining the horizontal and vertical offset for the M×N DCT block boundaries of a decompressed image produced by a DCT-based compression system, comprising the steps of:
   a) computing one or more selected DCT coefficients from nonoverlapping, contiguous M×N blocks of the decompressed image, beginning at a selected offset;
   b) computing a coefficient histogram from the set of values for each selected DCT coefficient obtained from the blocks of the decompressed image;
   c) computing a dispersion metric from each coefficient histogram; and
   d) repeating steps (a), (b), and (c) for a plurality of offsets within an M×N block in order to identify the offset that minimizes the coefficient dispersion, thereby determining the block boundaries of the decompressed image;
   wherein the dispersion metric is a ratio of the maximum to minimum histograms sums, wherein the sums are computed by summing the histogram counts at periodic intervals.

8. The method according to claim 1 wherein the one or more selected DCT coefficients is the DC coefficient.

9. The method according to claim 1 wherein the plurality of offsets corresponds to all possible offsets within the M×N block.

10. The method according to claim 1 wherein the decompressed image is a color image and steps a) through c) are completed for a luminance component of the color image.

11. The method according to claim 3 wherein a plurality of selected DCT coefficients are computed in step a) and a corresponding plurality of coefficient histograms, dispersion metrics and minimum dispersion coefficient histograms are computed in steps b1), b2) and d1), and wherein in step d2) the offset is determined from the plurality of minimum dispersion coefficient histograms.

12. The method according to claim 2 wherein step a) further comprises the steps of scaling the DCT coefficients and rounding each DCT coefficient to the nearest integer prior to computing the coefficient histogram in step b1).

13. A computer storage medium having instructions stored therein for causing a computer to perform the method of claim 1.

14. A system for determining the horizontal and vertical offset for the M×N DCT block boundaries of a decompressed image produced by a DCT-based compression system, said system comprising:
   a) means for computing one or more selected DCT coefficients from nonoverlapping, contiguous M×N blocks of the decompressed image, beginning at a selected offset;

b) means for determining a coefficient dispersion for each selected DCT coefficient from a set of values for the respective DCT coefficient obtained from the blocks of the decompressed image;

c) means for repeating the computing and determining in paragraphs (a) and (b) for a plurality of offsets within an M×N block; and means for identifying the offset that minimizes the coefficient dispersion, thereby determining the block boundaries of the decompressed image.

15. The system according to claim 14 wherein said means for determining a set of values further comprises:

means for computing a coefficient histogram from the set of values for each selected DCT coefficient obtained from the blocks of the decompressed image; and means for computing a dispersion metric from each coefficient histogram.

16. The system according to claim 15 wherein said means for identifying further comprises:

means for comparing the dispersion metrics corresponding to the plurality of offsets to determine the minimum dispersion coefficient histogram; and means for selecting the offset that corresponds to the minimum dispersion coefficient histogram as the offset for the DCT block boundaries.

17. The system according to claim 14, wherein M=8 and N=8.

18. The system according to claim 14, wherein the decompressed image is a JPEG-decompressed image.

19. The system according to claim 14, wherein the decompressed image is an MPEG-decompressed image.

20. A system for determining the horizontal and vertical offset for the M×N DCT block boundaries of a decompressed image produced by a DCT-based compression system, said system comprising:

a) means for computing one or more selected DCT coefficients from nonoverlapping, contiguous M×N blocks of the decompressed image, beginning at a selected offset;

b) means for processing a set of values for each selected DCT coefficient obtained from the blocks of the decompressed image in order to identify a coefficient dispersion; and c) means for repeating the computing and processing in paragraphs (a) and (b) for a plurality of offsets within an M×N block in order to identify the offset that minimizes the coefficient dispersion, thereby determining the block boundaries of the decompressed image;

wherein said means for processing a set of values further comprises:

means for computing a coefficient histogram from the set of values for each selected DCT coefficient obtained from the blocks of the decompressed image; and means for computing a dispersion metric from each coefficient histogram;

wherein said means for repeating further comprises:

means for comparing the dispersion metrics corresponding to the plurality of offsets to determine the minimum dispersion coefficient histogram; and means for selecting the offset that corresponds to the minimum dispersion coefficient histogram as the offset for the DCT block boundaries; and wherein the dispersion metric is a ratio of the maximum to minimum histograms sums, wherein the sums are computed by summing the histogram counts at periodic intervals.

21. The system according to claim 14 wherein the one or more selected DCT coefficients is the DC coefficient.

22. The system according to claim 14 wherein the plurality of offsets corresponds to all possible offsets within the M×N block.

23. The system according to claim 14 wherein the decompressed image is a color image and the computations are completed for a luminance component of the color image.

* * * * *